United States Patent
Ong et al.

(10) Patent No.: US 12,155,971 B2
(45) Date of Patent: *Nov. 26, 2024

(54) DURATION AND POTENTIAL REGION OF INTEREST FOR SUSPICIOUS ACTIVITIES

(71) Applicant: NEC Corporation, Tokyo (JP)

(72) Inventors: Hui Lam Ong, Singapore (SG); Satoshi Yamazaki, Singapore (SG); Hong Yen Ong, Singapore (SG); Wei Jian Peh, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,755

(22) Filed: Aug. 10, 2023

(65) Prior Publication Data

US 2023/0396738 A1 Dec. 7, 2023

Related U.S. Application Data

(63) Continuation of application No. 17/273,384, filed as application No. PCT/JP2019/032378 on Aug. 20, 2019, now Pat. No. 11,882,387.

(30) Foreign Application Priority Data

Sep. 6, 2018 (SG) .............................. 10201807675T

(51) Int. Cl.
 *H04N 7/18* (2006.01)
 *G06V 10/84* (2022.01)
 (Continued)

(52) U.S. Cl.
 CPC ............. *H04N 7/181* (2013.01); *G06V 10/84* (2022.01); *G06V 20/52* (2022.01); *G06V 40/16* (2022.01);
 (Continued)

(58) Field of Classification Search
 CPC .......... H04N 7/181; H04N 7/18; G06V 10/84; G06V 20/52; G06V 40/16; G06V 40/161;
 (Continued)

(56) References Cited

U.S. PATENT DOCUMENTS 9,336,451 B2 * 5/2016 Boghossian ........... H04N 7/181
9,911,047 B2 * 3/2018 Yamaji .................... G06V 20/46
(Continued)

FOREIGN PATENT DOCUMENTS

| GB | 2558841 A | 7/2018 |
| JP | 2011-070332 A | 4/2011 |
| WO | 2015/098442 A1 | 7/2015 |

OTHER PUBLICATIONS

US Notice of Allowance for U.S. Appl. No. 17/273,384, mailed on Sep. 21, 2023.
(Continued)

*Primary Examiner* — Bobbak Safaipour
(74) *Attorney, Agent, or Firm* — Sughrue Mion, PLLC.

(57) ABSTRACT

The method comprising determining a set of coordinates each for two or more appearances of a target subject within a sequence of images, the set of coordinates of the two or more appearances of the target subject defining a first path; determining a set of coordinates each for two or more appearances of a related subject within a sequence of images, the related subject relating to the target subject, the set of coordinates of the two or more appearances of the related subject defining a second path; determining one or more minimum distances between the first path and the second path so as to determine at least a region of interest; determining a timestamp of a first appearance and a timestamp of a last appearance of the target subject; and determining a timestamp of a first appearance and a timestamp of a last appearance of the related subject.

11 Claims, 12 Drawing Sheets

(51) Int. Cl.
*G06V 20/52* (2022.01)
*G06V 40/16* (2022.01)

(52) U.S. Cl.
CPC .......... *G06V 40/161* (2022.01); *G06V 40/171* (2022.01); *G06V 40/172* (2022.01)

(58) Field of Classification Search
CPC .... G06V 40/171; G06V 40/172; G06F 18/29; G06T 7/292
See application file for complete search history.

(56) References Cited

U.S. PATENT DOCUMENTS

| | | | | |
|---|---|---|---|---|
| 10,262,209 | B2* | 4/2019 | Werner | G06V 20/52 |
| 10,366,586 | B1* | 7/2019 | Leizerovich | G06V 20/52 |
| 10,607,348 | B2* | 3/2020 | Watanabe | H04N 7/183 |
| 10,810,727 | B2* | 10/2020 | Liu | H04N 7/188 |
| 11,882,387 | B2* | 1/2024 | Ong | H04N 7/18 |
| 2008/0130949 | A1* | 6/2008 | Ivanov | G06V 20/52 |
| | | | | 382/103 |
| 2013/0050502 | A1* | 2/2013 | Saito | G06T 7/20 |
| | | | | 348/169 |
| 2013/0201330 | A1* | 8/2013 | Thornton | G06V 10/255 |
| | | | | 348/143 |
| 2013/0222599 | A1* | 8/2013 | Shaw | G06V 20/52 |
| | | | | 345/635 |
| 2013/0225199 | A1* | 8/2013 | Shaw | G06Q 30/0201 |
| | | | | 455/456.1 |
| 2015/0381946 | A1* | 12/2015 | Renkis | G08B 13/19663 |
| | | | | 348/47 |
| 2016/0065906 | A1* | 3/2016 | Boghossian | G08B 13/19645 |
| | | | | 348/159 |
| 2016/0343147 | A1* | 11/2016 | Nukaga | G06F 18/22 |
| 2017/0212651 | A1* | 7/2017 | Courvoisier | G06F 9/451 |
| 2018/0032817 | A1 | 2/2018 | Loce et al. | |
| 2018/0144481 | A1* | 5/2018 | Shibata | G06V 40/173 |
| 2019/0019296 | A1* | 1/2019 | Watanabe | H04N 7/188 |
| 2019/0344710 | A1* | 11/2019 | Vincent | G08G 1/166 |
| 2020/0257890 | A1* | 8/2020 | Pu | G06T 7/73 |
| 2021/0089784 | A1* | 3/2021 | Rasulov | G06F 16/787 |
| 2021/0321220 | A1* | 10/2021 | Bahuguna | G16H 70/60 |
| 2023/0156159 | A1* | 5/2023 | Tanaka | G08B 13/19693 |
| | | | | 348/169 |
| 2023/0286530 | A1* | 9/2023 | Angerer | G01C 21/3807 |
| 2023/0290172 | A1* | 9/2023 | Ali | G06V 40/103 |

OTHER PUBLICATIONS

International Search Report for PCT Application No. PCT/JP2019/032378, mailed on Nov. 5, 2019.
Written opinion for PCT Application No. PCT/JP2019/032378, mailed on Nov. 5, 2019.

* cited by examiner

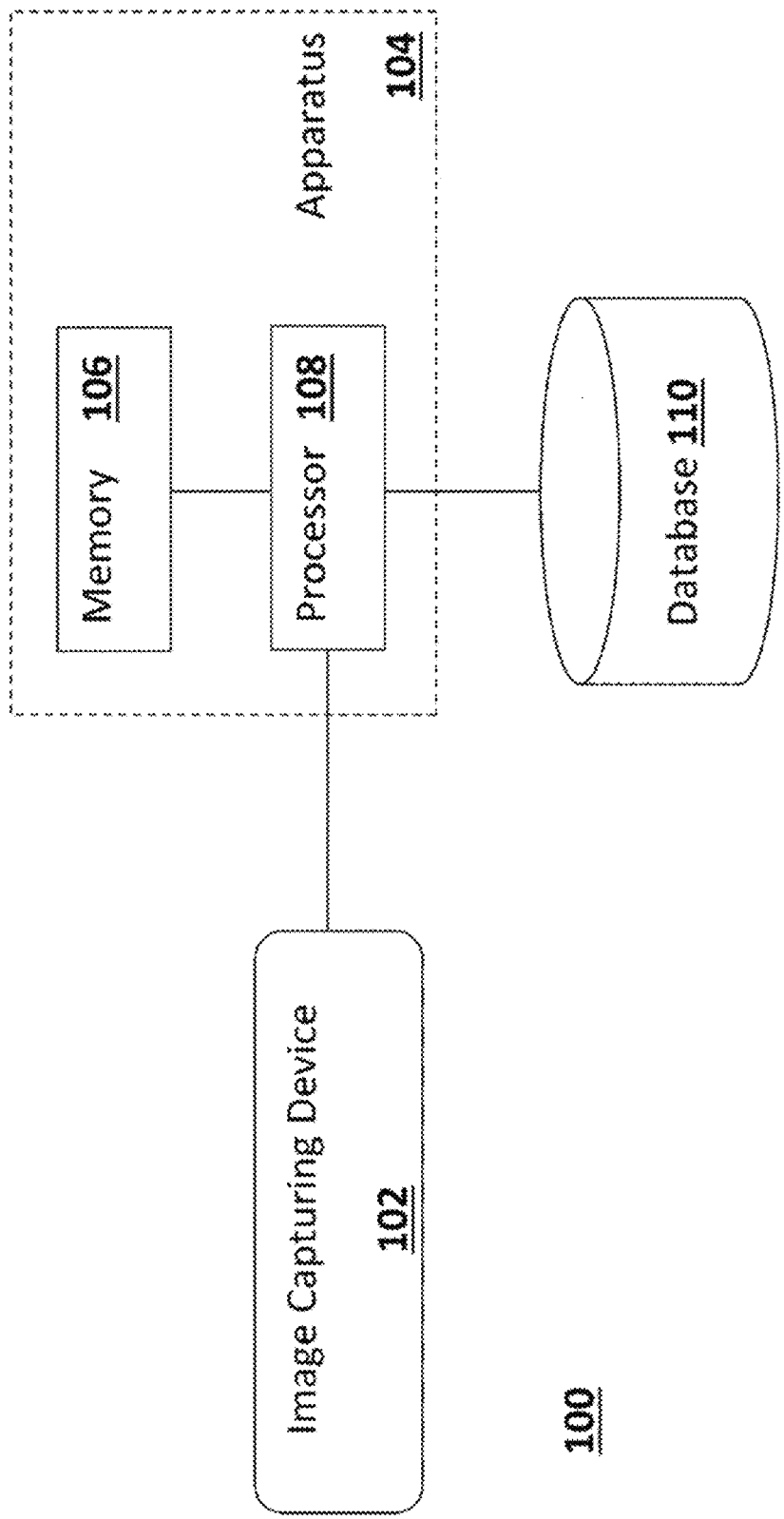

DURATION AND POTENTIAL REGION OF INTEREST FOR SUSPICIOUS ACTIVITIES

This application is a Continuation of U.S. application Ser. No. 17/273,384 filed on Mar. 4, 2021, which is a National Stage Entry of PCT/JP2019/032378 filed on Aug. 20, 2019, which claims priority from Singapore Patent Application 10201807675T filed on Sep. 6, 2018, the contents of all of which are incorporated herein by reference, in their entirety.

TECHNICAL FIELD

The present invention relates to a method for determining a duration and at least a potential region of interest for managing an event. In particular, this invention relates to determining a duration and at least a potential region of interest for suspicious activities including co-appearances with suspicious subjects using surveillance systems.

BACKGROUND ART

Organized criminal group operations in public spaces have increased in recent years. Public spaces like shopping malls, train stations and schools are considered soft targets as they are opened to the public and have lower security levels. Perpetrators planning an attack or a criminal act tend to conduct multiple rounds of detailed surveillance on potential soft targets during the initial planning phase to assess the suitability of these soft targets and the success rate of their attack or crime. Perpetrators also often choose public spaces to conduct other accessory activities like "dead dropping" suspicious/illegal items to exchange information with other associates of their network. There are existing solutions that are directed to detecting an appearance of perpetrators together. However, often, the perpetrators do not appear together at the same time so as to cover their tracks or hide their association with one another. Bustling crowds in public spaces tend to conceal these stealth activities from being detected easily and the appearances of perpetrators in these common public spaces also do not make their activities appear suspicious or out of the norm, thus making detection of such stealth activities difficult.

Discovering perpetrators and their network of associates and, in turn, detecting stealth activities are critical in fighting organized crime and preventing an attack from happening. Due to the rising trend of crimes happening in public spaces, the government and law enforcement bodies have deployed video surveillance systems to monitor public areas to assist in crime prevention and post investigation. While crime prevention using artificial intelligence (AI) is still at its research and experimental phase, law enforcement bodies are looking into speeding up post attack or crime investigation with the aid of smart video surveillance systems.

There are solutions directed to detection of suspicious persons and obvious associates based on time stamps and camera (location) images from surveillance systems, which provides important clues to law enforcement bodies on who, where and the timeframe that they should focus on in the investigation. However, these data are not processed, categorized and presented in a meaningful manner. There is no existing solution that helps to narrow down or zoom in to the potential suspicious associates, regions and duration in the recorded videos. It is an object of the present invention to substantially overcome the one or more existing challenges as discussed above to determine a duration and at least a potential region of interest for suspicious activities such as co-appearances of suspicious associates using surveillance systems.

SUMMARY OF INVENTION

Technical Problem

According to a first aspect of the present disclosure, there is provided a method for determining a duration and at least a region of interest for managing an event, the method comprising determining a set of coordinates each for two or more appearances of a target subject within a sequence of images, the set of coordinates of the two or more appearances of the target subject defining a first path; determining a set of coordinates each for two or more appearances of a related subject within a sequence of images, the related subject relating to the target subject, the set of coordinates of the two or more appearances of the related subject defining a second path; determining one or more minimum distances between the first path and the second path so as to determine at least a region of interest; determining a timestamp of a first appearance and a timestamp of a last appearance of the target subject; and determining a timestamp of a first appearance and a timestamp of a last appearance of the related subject when it is determined that at least one of the one or more minimum distances between the first path and the second path is within a predetermined distance so as to determine a duration of interest.

In an embodiment, the method comprises receiving, from an image capturing device, a plurality of image inputs relating to the event; identifying one or more of a characteristic information from each of the plurality of image inputs relating to the event; and determining if each of the one or more identified characteristic information is likely to correspond to a target subject characteristic information, the characteristic information comprising facial information and body movement information.

In an embodiment, the method comprises retrieving at least one of the received image inputs in response to determining when one of the one or more identified characteristic information is likely to correspond to the target subject characteristic information, the retrieved at least one of the received image inputs relating to the characteristic information that is likely to correspond to the target subject characteristic information.

In an embodiment, the method comprises retrieving, within a search period, at least one of the received image inputs in response to determining when one of the one or more identified characteristic information is likely to correspond to a target subject characteristic information, the retrieved at least one of the received image inputs relating to a characteristic information that is likely to not correspond to the target subject characteristic information, wherein the search period is one which starts at a pre-determined period before the first appearance of the target subject and ends at a pre-determined period after the last appearance.

In an embodiment, the method comprises determining another set of coordinates corresponding to another appearance of the target subject on the first path or related subject on the second path; and determining one or more set of coordinates on either one of the first path or the second path to a position on the other path so as to determine the one or more minimum distances.

In an embodiment, the method comprises determining if the determined one or more minimum distances between the first path and the second path is within a pre-determined distance so as to determine one or more minimum points.

In an embodiment, the method comprises connecting the one or more minimum points so as to determine the region of interest.

In an embodiment, the method comprises determining if at least one of the determined one or more minimum distances between the first path and the second path is within the pre-determined distance; and determining an earliest timestamp and a last timestamp from the determined timestamp of the first appearance of the target subject, the determined timestamp of the last appearance of the target subject, the determined timestamp of the first appearance of the related subject and the determined timestamp of the last appearance of the related subject, wherein the duration from the earliest timestamp to the last timestamp corresponds to the duration of interest, in response to determining that at least one of the determined one or more minimum distances between the first path and the second path is within the pre-determined distance.

Solution to Problem

According to a second aspect of the present disclosure, there is provided an apparatus for determining a duration and at least a region of interest for managing an event, the apparatus comprising a memory in communication with a processor, the memory storing a computer program recorded therein, the computer program being executable by the processor to cause the apparatus at least to determine a set of coordinates each for two or more appearances of a target subject within a sequence of images, the set of coordinates of the two or more appearances of the target subject defining a first path; determine a set of coordinates each for two or more appearances of a related subject within a sequence of images, the related subject relating to the target subject, the set of coordinates of the two or more appearances of the related subject defining a second path; determine one or more minimum distances between the first path and the second path so as to determine at least a region of interest; determine a timestamp of a first appearance and a timestamp of a last appearance of the target subject; and determine a timestamp of a first appearance and a timestamp of a last appearance of the related subject when it is determined that at least one of the one or more minimum distances between the first path and the second path is within a predetermined distance so as to determine a duration of interest.

Advantageous Effects of Invention

In an embodiment, the apparatus receives, from an image capturing device, a plurality of image inputs relating to the event; identifies one or more of a characteristic information from each of the plurality of image inputs relating to the event; and determines if each of the one or more identified characteristic information is likely to correspond to a target subject characteristic information, the characteristic information comprising facial information and body movement information.

In an embodiment, the apparatus retrieves at least one of the received image inputs in response to determining when one of the one or more identified characteristic information is likely to correspond to the target subject characteristic information, the retrieved at least one of the received image inputs relating to the characteristic information that is likely to correspond to the target subject characteristic information.

In an embodiment, the apparatus retrieves one or more further image inputs in response to determining when one of the one or more identified characteristic information is likely to correspond to the target subject characteristic information, the retrieved one or more further image inputs relating to the characteristic information that is likely to correspond to the target subject characteristic information; and retrieves a plurality of sets of coordinates and a plurality of timestamps, each relating to an appearance of the target subject within each of the retrieved one or more further image inputs, the plurality of sets of coordinates and the plurality of timestamps including the sets of coordinates and the timestamps of the first appearance and the last appearance of the target subject.

In an embodiment, the apparatus retrieves, within a search period, at least one of the received image inputs in response to determining when one of the one or more identified characteristic information is likely to correspond to a target subject characteristic information, the retrieved at least one of the received image inputs relating to a characteristic information that is likely to not correspond to the target subject characteristic information, wherein the search period is one which starts at a pre-determined period before the first appearance of the target subject and ends at a pre-determined period after the last appearance.

In an embodiment, the apparatus retrieves one or more further image inputs in response to determining when one of the one or more identified characteristic information is likely to correspond to the target subject characteristic information, the retrieved one or more further image inputs relating to the characteristic information that is likely to not correspond to the target subject characteristic information; and retrieves a plurality of sets of coordinates and a plurality of timestamps, each relating to an appearance of the related subject within each of the retrieved one or more further image inputs, the plurality of sets of coordinates and the plurality of timestamps including the sets of coordinates and the timestamps of the first appearance and the last appearance of the related subject.

In an embodiment, the apparatus determines another set of coordinates corresponding to another appearance of the target subject on the first path or related subject on the second path; and determines one or more set of coordinates on either one of the first path or the second path to a position on the other path so as to determine the one or more minimum distances.

In an embodiment, the apparatus determines if the determined one or more minimum distances between the first path and the second path is within a pre-determined distance so as to determine one or more minimum points.

In an embodiment, the apparatus connects the one or more minimum points so as to determine the region of interest.

In an embodiment, the apparatus determines if at least one of the determined one or more minimum distances between the first path and the second path is within the pre-determined distance; and determines an earliest timestamp and a last timestamp from the determined timestamp of the first appearance of the target subject, the determined timestamp of the last appearance of the target subject, the determined timestamp of the first appearance of the related subject and the determined timestamp of the last appearance of the related subject, wherein the duration from the earliest timestamp to the last timestamp corresponds to the duration of interest, in response to determining that at least one of the determined one or more minimum distances between the first path and the second path is within the pre-determined distance.

According to yet another aspect of the present disclosure, there is provided a system for determining a duration and at least a region of interest for managing an event, the system comprising the apparatus in the second aspect and at least one of an image capturing device.

BRIEF DESCRIPTION OF DRAWINGS

Embodiments of the invention will be better understood and readily apparent to one of ordinary skill in the art from the following written description, which provides examples only, and in conjunction with the drawings in which:

FIG. 1 shows a block diagram illustrating a system for determining a duration and at least a region of interest for managing an event according to an embodiment.

DESCRIPTION OF EMBODIMENTS

Figure 2A:
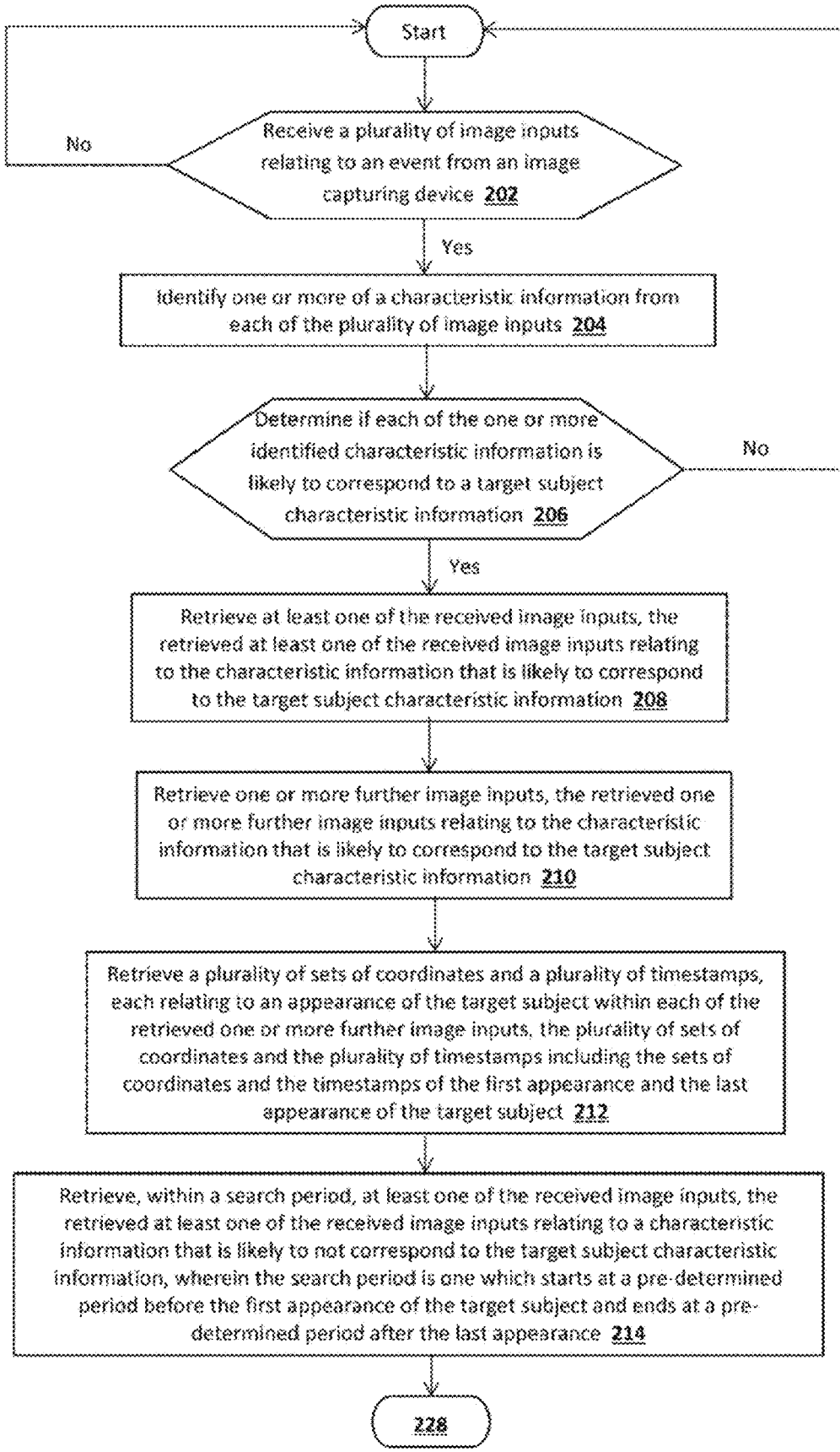
FIG. 2A shows a flow diagram illustrating a method for determining a duration and at least a region of interest for managing an event according to an embodiment.

Various embodiments provide apparatus and methods for determining a duration and at least a potential region of interest for suspicious activities including co-appearances with suspicious subjects for managing an event (such as managing the post investigation of an attack or a criminal act). A co-appearance may refer to an appearance of a target subject (such as a known or suspected perpetrator who is associated with or suspected to be associated with an event such as an attack or a criminal act) and one or more related subjects (such as his network of associates) either together at the same time within the same field of view of a surveillance camera or may refer to the appearance of the one or more related subjects within a specific period of time starting or ending from the appearance of the target subject.

The following disclosure provides a solution for addressing at least one of the above discussed challenges. One solution is to use an apparatus to determine a duration and at least a potential region of interest for managing an event by analysing characteristic information and retrieving sets of coordinates and timestamps of appearances of the identified characteristic information that are derived from a sequence of images, the sequence of images comprising two or more images (such as video frames from surveillance camera footage) related to the events. Through the determination of an earliest timestamp and a last timestamp from the determined timestamps of the respective first and last appearances of the target subject and the related subject, a duration of interest may be determined. Further, through the determination of the sets of coordinates corresponding to the location of a target subject or the location of one or more related subjects within a sequence of images across a period of time, movement paths of the target and related subjects may be formed by joining the respective sets of coordinates of a plurality of image inputs. A potential region of interest may then be determined using path analysis through the determination of one or more minimum distances between the paths of a target and its respective related subjects.

Determination of a duration and at least a potential region of interest for such co-appearances through the determination of presence of a target subject and its related subjects consolidates and presents the data or information collected from surveillance cameras in a meaningful manner which may be used to identify a specific period and location or area to focus on for post attack or crime investigation, which may have otherwise gone unnoticed with conventional methods of surveillance monitoring.

Conventionally, there has been several apparatus and methods for monitoring suspicious activities such as the use of a surveillance camera to record a video and then detect suspicious activities based on calculations of event occurring score of detected objects (including humans) and motions. Related events are flagged when their scores are high and the score (probability) can be modelled by machine learning (for example, using the Dynamical Bayesian Network). However, such a method requires various specific object detection technologies such as detection for bags, knives and/or other suspicious items.

Similar concepts such as trajectory similarity evaluation compute a similarity score between two tracking trails using location data (such as Global Positioning System, GPS) to monitor movement of objects of interest to understand the trend of the movement but do not identify potential suspicious objects, let alone identify a potential region of interest for suspicious co-appearances for post attack or crime investigation.

Further, by convention, there are also many devices and methods for monitoring regions of interest using motion detection whereby motion is detected in a pre-defined region of interest by monitoring the pixel changes based on historical video frames. This method has been used in many video monitoring applications to auto-capture images when changes are detected at the region of interest. However, this method requires the identification of a specific region of interest to monitor and does not solve the challenges of post crime investigation as discussed above.

There exists co-appearances detection methods where co-appearances of multiple persons captured within the same video frames include those of persons appearing next to each other and those of persons appearing in different direction and/or different coordinates are detected to discover association between a target person of interest and the co-appeared persons. Another one of such co-appearance group detection method involves calculating similarity scores based on velocities and/or distance between persons in a same frame to discover social groups whereby the velocities and distances are estimated by person tracking technology. However, these methods can only identify potential region of interest for suspicious co-appearances in same frames. At present, there are no methods available to identify both direct and indirect co-appearances. In other words, there are no methods currently available to identify co-appearances occurring within the same frame and not occurring within the same frame.

One embodiment of this disclosure addresses at least one of the challenges by applying path analysis on images captured from the inputs received in surveillance systems to determine a duration and at least a potential region of interest of co-appearances of a target subject and a related subject through the following:

- retrieval of image inputs and its corresponding coordinates and timestamps of likely appearances of the identified characteristic information of a target subject, whereby the image inputs may include video frames from surveillance camera footage;
- determine one or more related subject(s) that appear(s) within a pre-determined search period, the search period starting at a pre-determined period before the first appearance of the target subject and ends at a pre-determined period after the last appearance;
- retrieval of image inputs and its corresponding coordinates and timestamps of appearances of each of the related subject(s);
- construct paths for the target subject and each of the related subject(s) for the appearances by connecting image inputs coordinates;
- find the minimum distances between the target subject and the related subject(s) that satisfies a minimum distance (proximity) threshold;
- determine the earliest and last timestamp of the retrieved timestamps of the appearances of the target subject and the related subject to determine the duration of interest of the co-appearances.
- determine the one or more minimum points on the respective paths that are closest to the sections that form the respective minimum distances;
- connect the one or more minimum points to determine the potential region of interest of the co-appearances.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "receiving", "retrieving", "identifying", "predicting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

It is to be noted that the discussions contained in the "Background" section and that above relating to conventional methods relate to discussions of devices which form public knowledge through their use. Such should not be interpreted as a representation by the present inventor(s) or the patent applicant that such devices in any way form part of the common general knowledge in the art.

FIG. 1 shows a block diagram illustrating a system for determining a duration and at least a region of interest for managing an event according to an embodiment. In an example, the managing of image inputs relating to an event is performed by at least an image capturing device 102 and an apparatus 104. The system may be one that is used by investigators for post attack or crime investigation.

The system 100 comprises an image capturing device 102 in communication with the apparatus 104. In an implementation, the apparatus 104 may be generally described as a physical device comprising at least one processor 108 and at least one memory 106 including computer program code. The at least one memory 106 and the computer program code are configured to, with the at least one processor 108, cause the physical device to perform the operations described in FIG. 2A and FIG. 2B. The processor 108 is configured to receive a plurality of image inputs derived from the video frames of recording videos from the image capturing device 102 or to retrieve a plurality of image inputs derived from the video frames of recorded videos from the database 110.

The image capturing device 102 may be a device such as a closed-circuit television (CCTV) which provides a variety of information of which characteristic information, time information and video frame coordinates may be derived from the related event. In an implementation, the characteristic information derived from the image capturing device 102 may include a facial information of a known target subject who is closely linked to an event such as an attack or criminal act which is identified by an investigator and stored in memory 106 of the apparatus 104 or a database 110 accessible by the apparatus 104. Other characteristic information may include body movements such as squatting or bending over. It is to be appreciated that the database 110 may be a part of the apparatus 104.

The apparatus 104 may be configured to communicate with the image capturing device 102 and the database 110. In an example, the apparatus 104 may receive, from the image capturing device 102, or retrieve from the database 110, image inputs and, after processing by the processor 108 in apparatus 104, generate an output which may be used to define the duration and at least a potential region of interest for co-appearances such as other suspicious persons and/or suspicious activities for managing an event (such as managing the post investigation of an attack or a criminal act).

In an embodiment, after receiving a plurality of image inputs from the image capturing device 102 or retrieving a plurality of image inputs from the database 110, the memory 106 and the computer program code stored therein are configured to, with the processor 108, cause the apparatus 104 to identify one or more of a characteristic information from each of the plurality of image inputs through characteristic detection techniques. The apparatus 104 is then configured to determine if each of the one or more identified characteristic information is likely to correspond to a target subject characteristic information which was stored in the database 110. Next, the apparatus 104 is further configured to retrieve one or more image inputs and their corresponding location coordinates and timestamps relating to the characteristic information that is likely to correspond to the target subject characteristic information upon the determination that at least one identified characteristic information is likely to correspond to a target subject characteristic information. The apparatus 104 is further configured to determine one or more related subject(s) that appear(s) within a pre-determined search period, the search period starting at a pre-determined period before the first appearance of the target subject and ends at a pre-determined period after the last appearance and retrieve the image inputs and the corresponding coordinates and timestamps of appearances of each of the related subject(s). The apparatus 104 is further configured to construct paths for the target subject and each of the related subject(s) for the appearances by connecting the respective coordinates of the image inputs coordinates, then find the minimum distances between the target subject path and each of the related subject path that satisfies a pre-determined minimum distance (proximity) threshold so as to determine which are the one or more minimum points on the respective paths that are closest to the sections that form the respective minimum distances. The apparatus 104 is then configured to connect the one or more minimum points to determine the potential region of interest of the co-appearances. Further, in response to determining that there is at least one minimum distance between the target subject path and each of the related subject path that satisfies a pre-determined minimum distance (proximity) threshold, determine an earliest timestamp and a last timestamp from the determined timestamps of the first and last appearances of the target subject and each of the related subject(s) so as to determine the duration of interest of the respective co-appearances; the duration of interest being the duration from the earliest timestamp to the last timestamp.

Figure 2B:
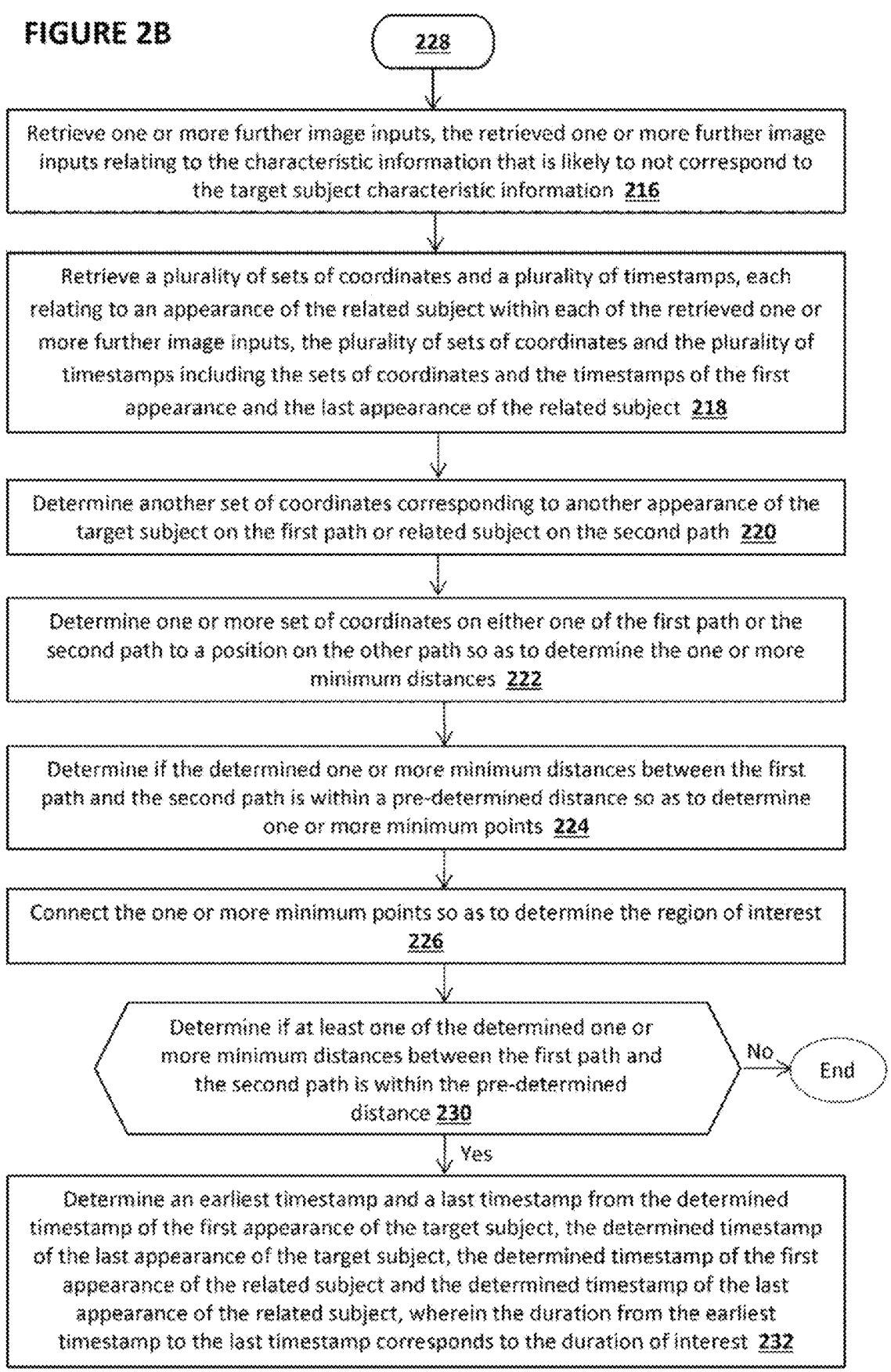
FIG. 2B shows a flow diagram illustrating a method for determining a duration and at least a region of interest for managing an event according to an embodiment.

FIG. 2A and FIG. 2B show a flow diagram illustrating a method for determining a duration and at least a region of interest for managing an event according to an embodiment. One or more characteristic information are identified from each of the plurality of image inputs that are received from the image capturing device 102 and processed to determine if a target subject appears in the image inputs and then identify one or more related subjects that co-appear (within the same field of view of the image capturing device but at a different time across different video frames) with the target subject, if it is determined that the target subject did appear in the image inputs. Using conventional techniques, such a detection of related subjects that co-appear with the target subject would be time-consuming and tedious if done manually or would be impossible to uncover since only related subjects that appear within the same video frame can be identified.

Referring to FIG. 2A, at step 202 a plurality of image inputs relating to an event is received from an image capturing device 102. In an embodiment, an event like a World Cup match may be input and image inputs (such as video frames from surveillance camera footage) relating to the event may be received from the image capturing device 102. Additionally or alternatively, the plurality of image inputs may be retrieved, after the event has occurred or is in the midst of occurring, from the database 110.

At step 204, one or more of a characteristic information from each of the plurality of image inputs is identified. In an embodiment, the one or more of a characteristic information such as a facial information may be identified based on a side profile of the subject.

At step 206, it is determined if each of the one or more identified characteristic information is likely to correspond to a target subject characteristic information. In an embodiment, a target subject characteristic information may be retrieved from the database 110. At least a part of the target subject characteristic information is required. For example, prominent facial characteristics such as a facial mole or a side profile of the target subject's face. The identified facial information may be determined to be likely to correspond to that of a target subject if at least a part of the one or more identified facial information matches at least a part of the target subject facial information. In other words, it is not necessary for the identified facial information to be identical to the target subject facial information.

At step 208, at least one of the received image inputs relating to the characteristic information that is likely to correspond to the target subject characteristic information is retrieved in response to determining that one of the one or more identified characteristic information is likely to correspond to the target characteristic information. In an embodiment, step 208 is performed if it is determined that at least one of the each of the one or more identified characteristic information is likely to correspond to the target subject characteristic information. Alternatively, if it is determined that each of the one or more identified characteristic information is not likely to correspond to the target subject characteristic information, it will go back to the step prior to step 202. For example, if it is determined at step 206 that a target subject's appearance is likely to have been captured in at least one of the identified characteristic information from the plurality of image inputs such as video frames from a surveillance camera footage of an event, then at step 208, at least one of such a received image input which has the likely appearance of the target subject will be retrieved so that information associated with the appearance of the target subject such as sets of coordinates of the location of the target subject within the field of view of the surveillance camera and time of appearance may be retrieved in subsequent steps. The at least one of the received image inputs and the target subject characteristic information may be retrieved from the database 110.

At step 210, one or more further image inputs relating to the characteristic information that is likely to correspond to the target subject characteristic information is retrieved. In an embodiment, one or more further image inputs may be retrieved from the database 110 if the target subject is likely to appear in more than one image inputs. For example, if the target subject enters the field of view of the surveillance camera with a first appearance at time 09:06:10 (hh:mm:ss) then leaves the field of view with a last appearance at time 09:06:12, assuming a video frame rate of one frame per second, there may be three video frames that have captured the appearance of the target subject from 09:06:10 to 09:06:12. Hence, step 210 may proceed to retrieve these three video frames that relate to the characteristic information that is likely to correspond to the target subject characteristic information. Step 210 retrieves every received image input which has the likely appearance of the target subject so that information associated with the appearances of the target subject such as sets of coordinates of the location of the target subject within the field of view of the surveillance camera and time of appearances may be retrieved in subsequent steps.

At step 212, a plurality of sets of coordinates and a plurality of timestamps, each relating to an appearance of the target subject within each of the retrieved one or more further image inputs is retrieved, wherein the plurality of sets of coordinates and the plurality of timestamps include the sets of coordinates and the timestamps of the first appearance and the last appearance of the target subject. Each of the plurality of sets of coordinates and each of the plurality of timestamps may be retrieved in each of the image inputs received in step 202. Each set of coordinates may represent a location of a subject at a point in time in at least two-dimensional or three-dimensional manner. In an embodiment, the plurality of sets of coordinates may be retrieved from the grid position information of the target subject within the image input. The retrieved plurality of sets of coordinates of the target subject may be joined to define a first path.

At step 214, at least one of the received image inputs relating to a characteristic information that is likely to not correspond to the target subject characteristic information is retrieved within a search period, wherein the search period is one which starts at a pre-determined period before the first appearance of the target subject and ends at a pre-determined period after the last appearance. In an embodiment, the at least one of the received image inputs and the target subject characteristic information may be retrieved from the database 110. Step 214 advantageously identifies subjects that may potentially be related to the target subject by searching for subjects other than the target subject who appear within a pre-determined period before the first appearance of the target subject and a pre-determined period after the last appearance of the target subject. These subjects may not appear in the same image input as the target subject as they try to cover their tracks or hide their association with one another. The characteristic information of the at least one of the received image inputs identified in step 204 may be determined to be likely not to correspond to that of a target subject if all parts of the one or more identified characteristic information does not match at least a part of the target subject characteristic information. The pre-determined period used to determine the search period may be set by the user and may be retrieved from the database 110. For example, the pre-determined period may correspond to the type of the event that is input in step 202.

At step 216, one or more further image inputs relating to the characteristic information that is likely to not correspond to the target subject characteristic information is retrieved. In other words, one or more further image inputs may be retrieved from the database 110 if the related subject is determined to have appeared in more than one image inputs such as video frames from a surveillance camera footage within the search period, based on the one or more of a characteristic information identified from each of the plurality of image inputs at step 204.

For example, if the related subject enters the field of view of the surveillance camera with a first appearance at time 09:08:20 (hh:mm:ss) and then leaves the field of view with a last appearance at time 09:08:22 within a search period determined in step 214 such as five minutes before the first appearance of the target subject (at 09:06:10) and five minutes after the last appearance of the target subject (at 09:06:12), assuming a video frame rate of one frame per second, there may be three video frames that have captured the appearance of the related subject from 09:08:20 to 09:08:22 within the search period from 09:01:10 to 09:11:12. It is to be appreciated that the appearance of the related subject may be one that does not overlap with that of the appearance of the target subject. In other words, the video frames corresponding to the appearance of the related subject may be different from the video frames corresponding to the appearance of the target subject. Hence, step 216 may proceed to retrieve these three video frames that relate to the characteristic information that correspond to the related subject characteristic information. Step 216 retrieves every received image input which has the appearance other than the target subject so that information associated with the appearances of these related subject(s) such as sets of coordinates of the location of the related subject(s) within the field of view of the surveillance camera and time of appearances may be retrieved in subsequent steps.

At step 218, a plurality of sets of coordinates and a plurality of timestamps, each relating to an appearance of the related subject within each of the retrieved one or more further image inputs is retrieved, wherein the plurality of sets of coordinates and the plurality of timestamps include the sets of coordinates and the timestamps of the first appearance and the last appearance of the related subject. Each of the plurality of sets of coordinates and each of the plurality of timestamps may be retrieved in each of the image inputs received in step 202. Each set of coordinates may represent a location of a subject at a point in time in at least two-dimensional or three-dimensional manner. In an embodiment, the plurality of sets of coordinates may be retrieved from the grid position information of the related subject within the image input. The retrieved plurality of sets of coordinates of the related subject may be joined to define a second path.

At step 220, another set of coordinates corresponding to another appearance of the target subject on the first path or related subject on the second path is determined. In an embodiment, the another set of coordinates corresponding to another appearance of the target subject on the first path or related subject on the second path may be determined in consideration with the determination of one or more set of coordinates on either one of the first path or the second path to a position on the other path at step 222 so as to form a minimum distance between the first path and the second path according to a set of pre-determined rules in the computer program stored in memory 106. Take for example, the target subject enters the field of view of the surveillance camera with a first appearance at time 09:06:10 (hh:mm:ss) then leaves the field of view with a last appearance at time 09:06:12, assuming a video frame rate of one frame per second, there may be three video frames that have captured the appearance of the target subject from 09:06:10 to 09:06:12. Accordingly, three sets of coordinates, one from each of the three respective video frames may be retrieved. With the retrieved set of coordinates other than those of the first and last appearances of the target subject, the first path may be partitioned further into short paths such as one starting from the set of coordinates of the first appearance to the set of coordinates that corresponds to the second video frame and another short path starting from the set of coordinates that corresponds to the second video frame to the set of coordinates of the last appearance of the target subject. Similar short paths on the second path may be determined in a similar manner. Subsequently, the another set of coordinates corresponding to another appearance of the target subject on the first path may be determined to be the nearest point on a short path of the first path to the nearest short path of the second path that forms the shortest distance between the first and second short paths.

At step 222, one or more minimum distances between the first path and the second path is determined in response to the determination of one or more set of coordinates on either one of the first path or the second path to a position on the other path. As mentioned earlier, in an embodiment, the one or more minimum distances between the first path and the second path may be determined by the processor 108 based on a set of pre-determined rules in the computer program stored in memory 106. The method for determining the one or more minimum distances between the first path and the second path in response to the determination of one or more set of coordinates on either one of the first path or the second path to a position on the other path are explained in further detail in the description of FIG. 7A and FIG. 7B. The determination of the minimum distances between a short path of the first path to a short path of the second path is repeated for every short path that is partitioned from the first and second path.

At step 224, it is determined if the determined one or more minimum distances between the first path and the second path is within a pre-determined distance so as to determine one or more minimum points. In an embodiment, the pre-determined distance may be set by the user and may be retrieved from the database 110. The one or more minimum points may be determined as the points (sets of coordinates) on either the first short path or the second short path closest to the minimum distance formed between both paths that are within the pre-determined (proximity) distance.

At step 226, the one or more minimum points are connected so as to determine the region of interest. It is to be appreciated that a subset of minimum points identified in step 224 may be connected in step 226.

At step 230, it is determined if at least one of the determined one or more minimum distances between the first path and the second path is within the pre-determined distance.

At step 232, an earliest timestamp and a last timestamp is determined from the determined timestamp of the first appearance of the target subject, the determined timestamp of the last appearance of the target subject, the determined timestamp of the first appearance of the related subject and the determined timestamp of the last appearance of the related subject, wherein the duration from the earliest timestamp to the last timestamp corresponds to the duration of interest if it is determined that at least one of the determined one or more minimum distances between the first path and the second path is within the pre-determined distance.

Take for example, it is determined that there is at least one minimum distance between the first path and the second path that is within the pre-determined distance for a target subject that enters the field of view of the surveillance camera with a first appearance at time 09:06:10 (hh:mm:ss) and then leaves the field of view with a last appearance at time 09:06:12 and for a related subject that enters the field of view of the surveillance camera with a first appearance at time 09:08:20 (hh:mm:ss) and then leaves the field of view with a last appearance at time 09:08:22, the earliest timestamp may be determined as 09:06:10 and the last timestamp may be determined as 09:08:22. Accordingly, the duration of interest may be determined as the duration between 09:06:10 to 09:08:22.

While FIG. 2A and FIG. 2B show steps 202 to 230 on how a duration and at least a potential region of interest for co-appearances may be determined, it should be appreciated that in various embodiments, steps 212, 218, 222 and 230 may be performed to sufficiently determine a duration and at least a potential region of interest for co-appearances. It should also be appreciated that steps 202 to 230 may be performed in parallel rather than sequentially.

Figure 3:
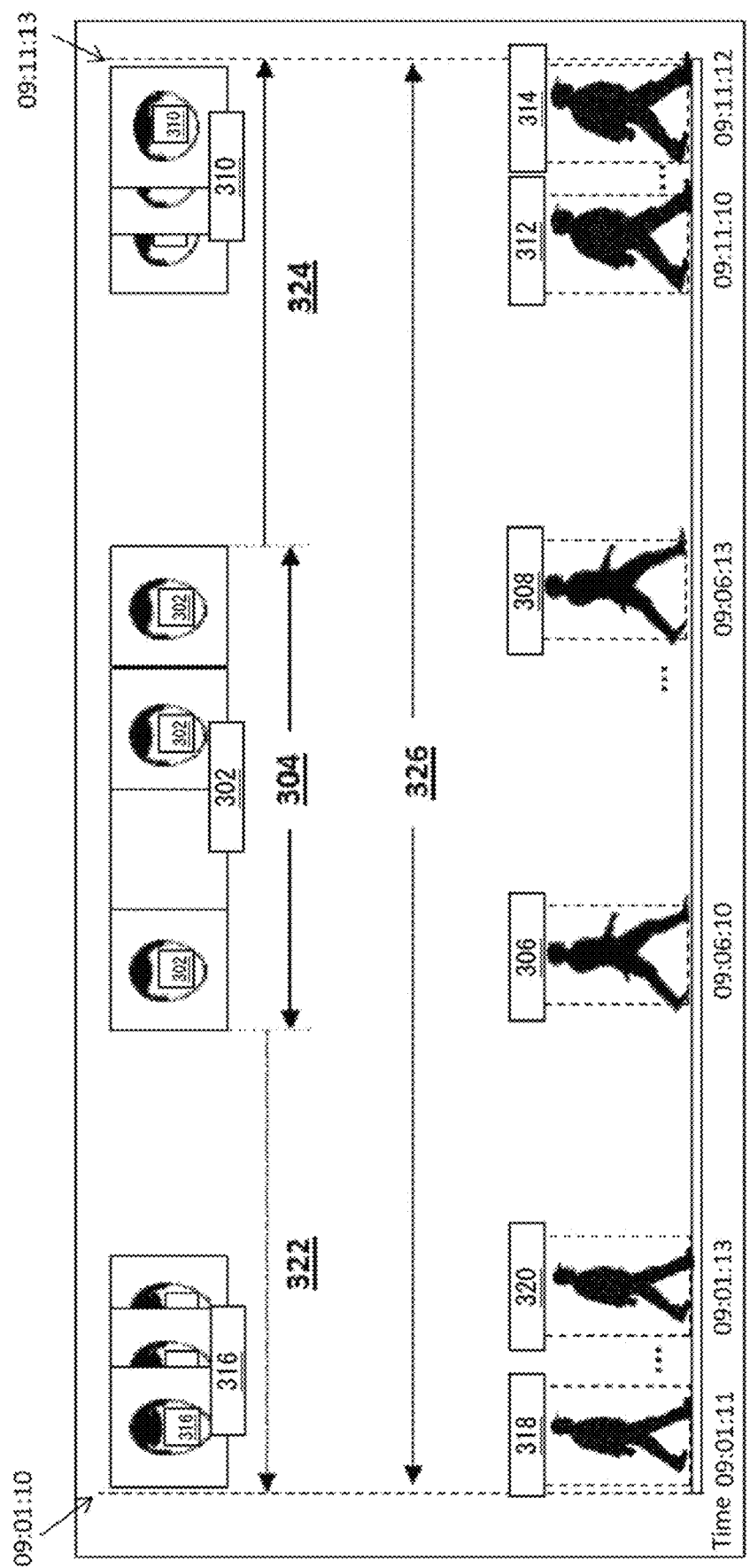
FIG. 3 illustrates examples of co-appearances of related subjects with respect to an appearance of the target subject in an embodiment.

FIG. 3 illustrates examples of co-appearances of related subjects with respect to an appearance of the target subject in an embodiment. 304 defines one appearance of a target subject 302 across a certain timeframe, with 3 out of 4 consecutive video frames capturing the image information of the target subject. In an example, one appearance of a target subject may be taken to include a number of consecutive video frames of the same target subject appearing, disappearing and then re-appearing within a specified timeframe with 306 corresponding to the first appearance of the target subject and 308 corresponding to the last appearance of the target subject in the one appearance 304.

Subsequently, as shown in FIG. 3, a co-appearance search period 326 used to identify subjects related to the target subject is defined as one which starts at a pre-determined period 322 (e.g. five minutes) before the first appearance 306 (e.g. at time 09:06:10) of the target subject 302 and ends at a pre-determined period 324 (e.g. five minutes) after the last appearance 308 (e.g. at time 09:06:13) of the target subject 302 in step 214. In FIG. 3, there is a related subject 316 detected before the first appearance 306 of the target subject, with a corresponding first appearance 318 (e.g. at time 09:04:15) and a last appearance 320 (e.g. at time 09:04:17). Further, there is another related subject 310 detected after the last appearance 308 of the target subject, with a corresponding first appearance 312 (e.g. at time 09:08:20) and a last appearance 314 (e.g. at time 09:08:22). It should be appreciated that any related subjects that appear within the co-appearance search period 326 (e.g. between 09:01:10 to 09:11:13) would be detected as related subjects in steps 214 and 216.

Figure 4A:
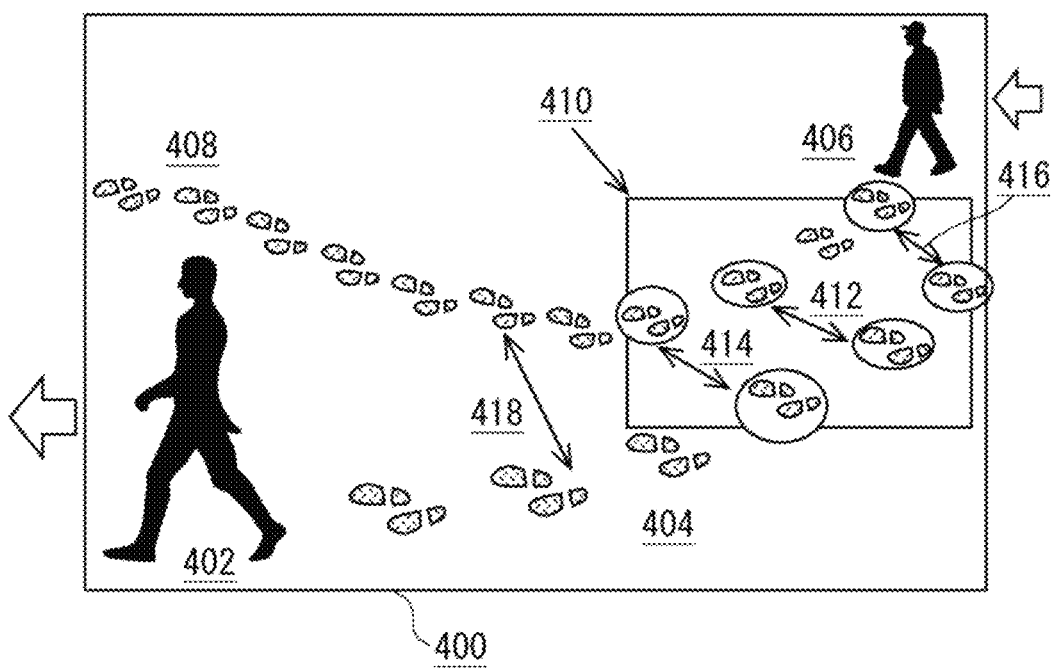
FIG. 4A illustrates an example of a first path of a target subject and a second path of a related subject in an embodiment.
Figure 4B:
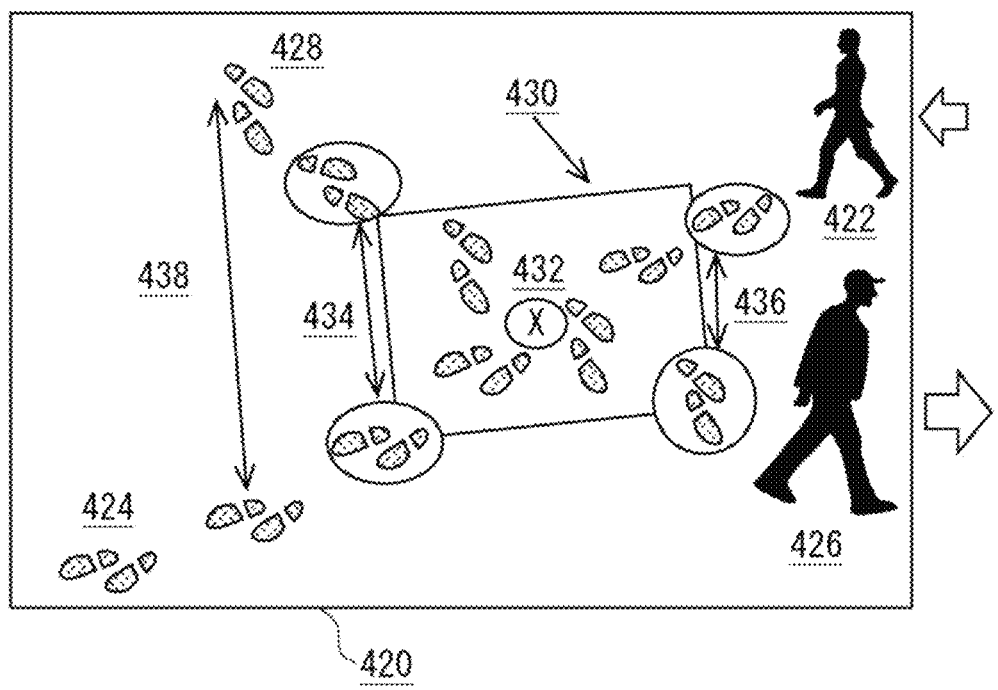
FIG. 4B illustrates an example of a first path of a target subject and a second path of a related subject in an embodiment.

FIG. 4A and FIG. 4B each illustrates an example of a first path of a target subject and a second path of a related subject in an embodiment. FIG. 4A illustrates the example when the path of the target subject and that of the related subject do not intersect. In the frame 400, multiple video frames covering the same field of view across the timeframe of one appearance of a target subject 402 are overlayed to show a plurality of sets of coordinates (represented by footprints in the figure) of the target subject to define a first path 404 as in step 212. Further, in the frame 400, there are also multiple video frames covering the same field of view across the timeframe of an appearance of a related subject 406 which are overlayed to show a plurality of sets of coordinates (represented by footprints in the figure) of the related subject to define a second path 408 as in step 218.

In order to determine one or more minimum distances between the first path and the second path as in step 220, another set of coordinates corresponding to another appearance of the target subject on the first path 404 or another set of coordinates corresponding to another appearance of the related subject on the second path 408 is determined. Subsequently, one or more minimum distances such as 412, 414, 416 and 418 (denoted by the double headed arrows in the figure) between the first path and the second path is determined, in response to the determination of the one or more set of coordinates on either one of the first path or the second path to a position on the other path in step 222. If it was further determined at step 224 that the determined one or more minimum distances between the first path and the second path are within a pre-determined distance (such as 412, 414 and 416), the points (sets of coordinates) on either the first path or the second path closest to the minimum distance formed between both paths will be identified as the one or more minimum points (denoted by circled footprints in the figure). 410 shows the connection of the one or more identified minimum points so as to determine the largest possible region of interest of the co-appearances of the target subject and the related subject as in step 226.

If it was further determined at step 230 that at least one of the determined one or more minimum distances between the first path and the second path is within the pre-determined distance (such as 412, 414 and 416), an earliest timestamp and a last timestamp is determined from the determined timestamp of the first appearance of the target subject, the determined timestamp of the last appearance of the target subject, the determined timestamp of the first appearance of the related subject and the determined timestamp of the last appearance of the related subject, wherein the duration from the earliest timestamp to the last timestamp corresponds to the duration of interest.

FIG. 4B illustrates the example when the path of the target subject and that of the related subject intersect. In the frame 420, multiple video frames covering the same field of view across the timeframe of one appearance of a target subject 422 are overlayed to show a plurality of sets of coordinates (represented by footprints in the figure) of the target subject to define a first path 424 as in step 212. Further, in the frame 420, there are also multiple video frames covering the same field of view across the timeframe of an appearance of a related subject 426 which are overlayed to show a plurality of sets of coordinates (represented by footprints in the figure) of the related subject to define a second path 428 as in step 218.

In order to determine one or more minimum points between the first path and the second path as in step 220, another set of coordinates corresponding to another appearance of the target subject on the first path 424 or another set of coordinates corresponding to another appearance of the related subject on the second path 428 is determined. Subsequently, one or more minimum distances such as 432, 434, 436 and 438 (denoted by the double headed arrows in the figure and an intersection point 432) between the first path and the second path is determined, in response to the determination of the one or more set of coordinates on either one of the first path or the second path to a position on the other path in step 222. If it was further determined at step 224 that the determined one or more minimum distances between the first path and the second path are within a pre-determined distance (such as 432, 434 and 436), the points (sets of coordinates) on either the first path or the second path closest to the minimum distance formed between both paths will be identified as the one or more minimum points (denoted by circled footprints and circled "x" in the figure). 430 shows the connection of the one or more identified minimum points so as to determine the largest possible region of interest of the co-appearances of the target subject and the related subject as in step 226.

If it was further determined at step 230 that at least one of the determined one or more minimum distances between the first path and the second path is within the pre-determined distance (such as 432, 434 and 436), an earliest timestamp and a last timestamp is determined from the determined timestamp of the first appearance of the target subject, the determined timestamp of the last appearance of the target subject, the determined timestamp of the first appearance of the related subject and the determined timestamp of the last appearance of the related subject, wherein the duration from the earliest timestamp to the last timestamp corresponds to the duration of interest.

Figure 5A:
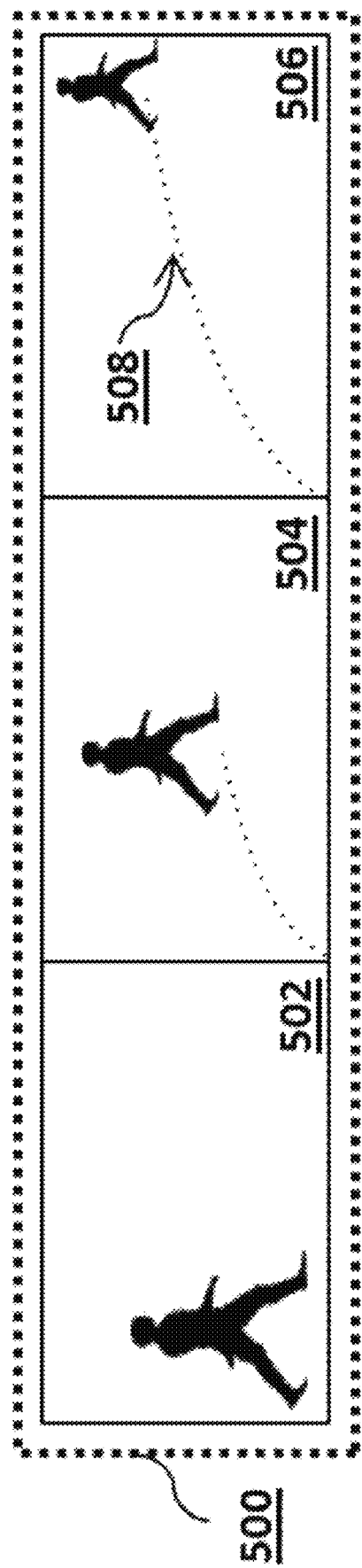
FIG. 5A illustrates an example of a first path of a target subject and a second path of a related subject in an embodiment.
Figure 5B:
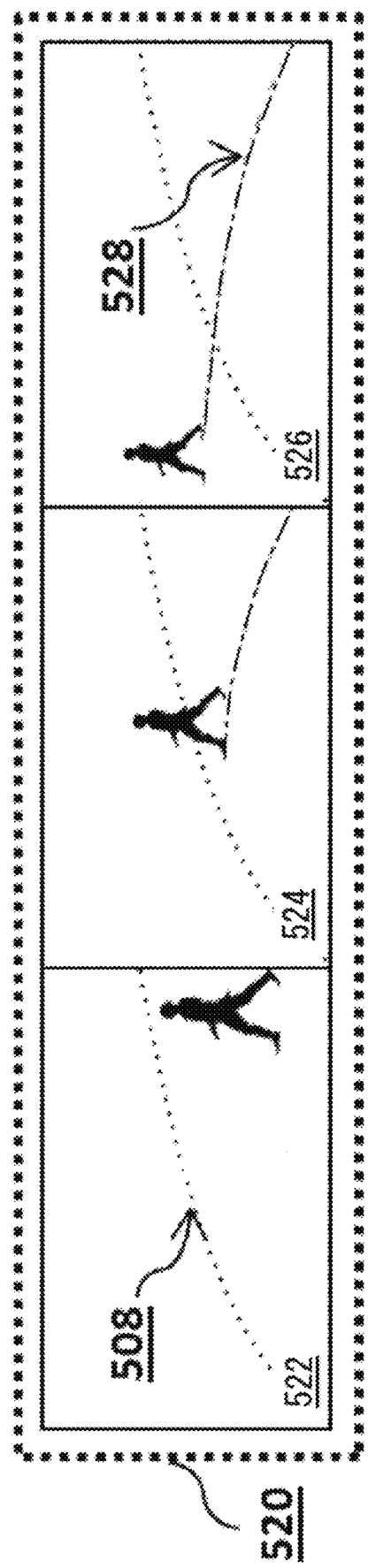
FIG. 5B illustrates an example of a first path of a target subject and a second path of a related subject in an embodiment.

FIG. 5A and FIG. 5B each illustrates an example of a first path of a target subject and a second path of a related subject in an embodiment. In the frame 500, there are three video frames covering the same field of view across the timeframe of one appearance of a target subject where 502 denotes the first appearance of the target subject, 504 denotes a further appearance of the target subject and 506 denotes the last appearance of the target subject thereby forming a first path 508 by joining the coordinates of the target subject at each appearance 502, 504 and 506. Further, in the frame 520, there are three video frames covering the same field of view across the timeframe of one appearance of a related subject where 522 denotes the first appearance of the related subject, 524 denotes a further appearance of the related subject and 526 denotes the last appearance of the related subject thereby forming a second path 528 by joining the coordinates of the related subject at each appearance 522, 524 and 526. The first path 508 and the second path 528 intersect in this example.

Figure 6:
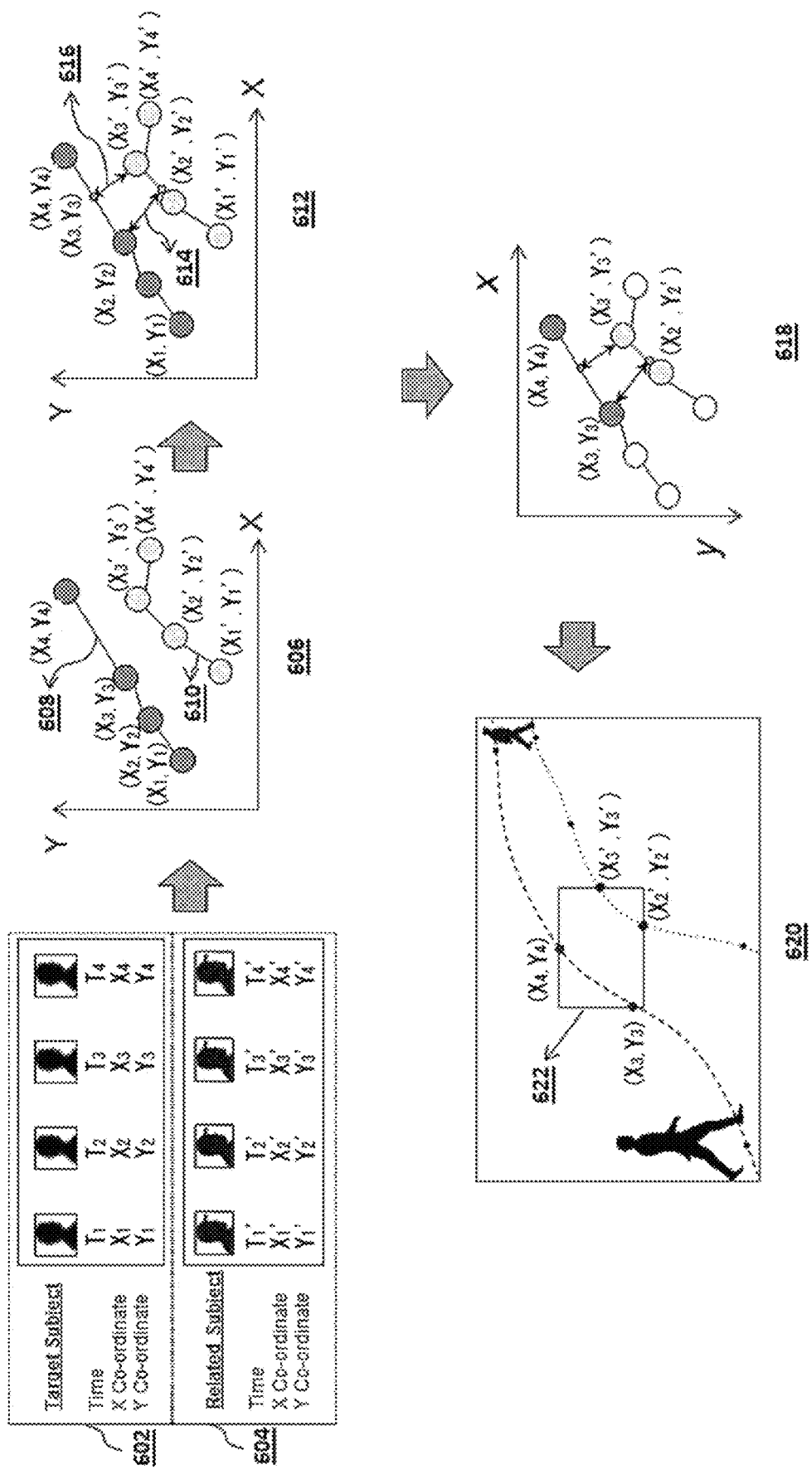
FIG. 6 illustrates an example of how a region of interest may be determined in an embodiment.

FIG. 6 illustrates an example of how a region of interest may be determined in an embodiment. 602 represents the respective time ($T_1$, $T_2$, $T_3$, $T_4$) and set of coordinates (X-Y coordinates [$X_1,Y_1$], [$X_2,Y_2$], [$X_3,Y_3$] and [$X_4,Y_4$]) information for each of four video frames of an appearance of a target subject. 604 represents the respective time ($T_1'$, $T_2'$, $T_3'$, $T_4'$) and set of coordinates (X-Y coordinates [$X_1',Y_1'$], [$X_2',Y_2'$], [$X_3',Y_3'$] and [$X_4',Y_4'$]) information for each of four video frames of an appearance of a related subject.

606 illustrates the sets of coordinates of the target subject and those of the related subject on an X-Y plot with 608 denoting the path of the target subject, which is the first path by drawing connecting lines between 2 neighbouring points (sets of coordinates) and 610 denoting the path of the related subject, which is the second path by drawing connecting lines between 2 neighbouring points (sets of coordinates). 612 shows examples of two minimum distances 614 and 616 between the first path and the second path where the minimum distance between both paths is determined by finding the shortest distance between 2 connecting lines. It is to be appreciated that in order to determine the one or more minimum distances so as to determine at least a region of interest, one of the ways is to calculate the shortest distances over every connecting line pairs and then picking up the calculated shortest distances which are within the predetermined minimum distance threshold as the one or more minimum distances. In the example, 614 is the shortest distance between the connecting line of $[X_2,Y_2]$, $[X_3,Y_3]$ and the connecting line of $[X_2',Y_2']$, $[X_3',Y_3']$ and 616 is the shortest distance between the connecting line of $[X_3,Y_3]$, $[X_4,Y_4]$ and the connecting line of $[X_3',Y_3\ ]$, $[X_4',Y_4']$. The method of determining the shortest distance between 2 connecting lines will be further illustrated in FIG. 7A and FIG. 7B for clarity.

Subsequently, in the example shown in FIG. 6, the minimum distances 614 and 616 are determined to be within the pre-determined distance. As a result, the minimum points are thus identified as the points $[X_3,Y_3]$, $[X_4,Y_4]$ on the first path and $[X_2',Y_2']$, $[X_3',Y_3']$ on the second path; $[X_3,Y_3]$ and $[X_2',Y_2']$ being the closest points, on the first path and the second path respectively, to the minimum distance 614 formed between both paths and $[X_4,Y_4]$ and $[X_3',Y_3']$ being the closest points, on the first path and the second path respectively, to the minimum distance 616 formed between both paths.

With $[X_3,Y_3]$, $[X_4,Y_4]$ on the first path and $[X_2',Y_2']$, $[X_3',Y_3']$ on the second path being identified as the minimum points, a region of interest 622 as represented in 620 is then determined by connecting the minimum points $[X_3,Y_3]$, $[X_4,Y_4]$, $[X_2',Y_2']$ and $[X_3',Y_3']$.

Since the minimum distances 614 and 616 are determined to be within the pre-determined distance, an earliest timestamp and a last timestamp is determined from the determined timestamp $T_1$ of the first appearance of the target subject, the determined timestamp of the last appearance of the target subject $T_4$, the determined timestamp $T_1'$ of the first appearance of the related subject and the determined timestamp $T_4'$ of the last appearance of the related subject, wherein the duration from the earliest timestamp to the last timestamp corresponds to the duration of interest.

Figure 7A:
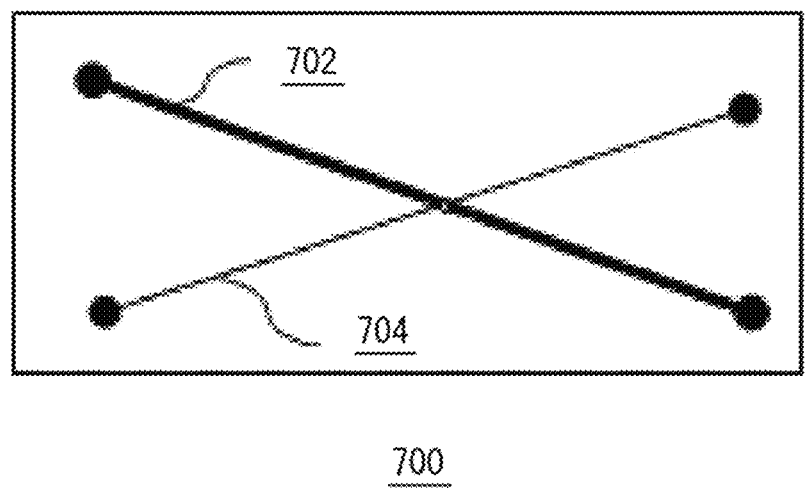
FIG. 7A illustrates example(s) of how to determine the shortest distance between 2 lines.
Figure 7B:
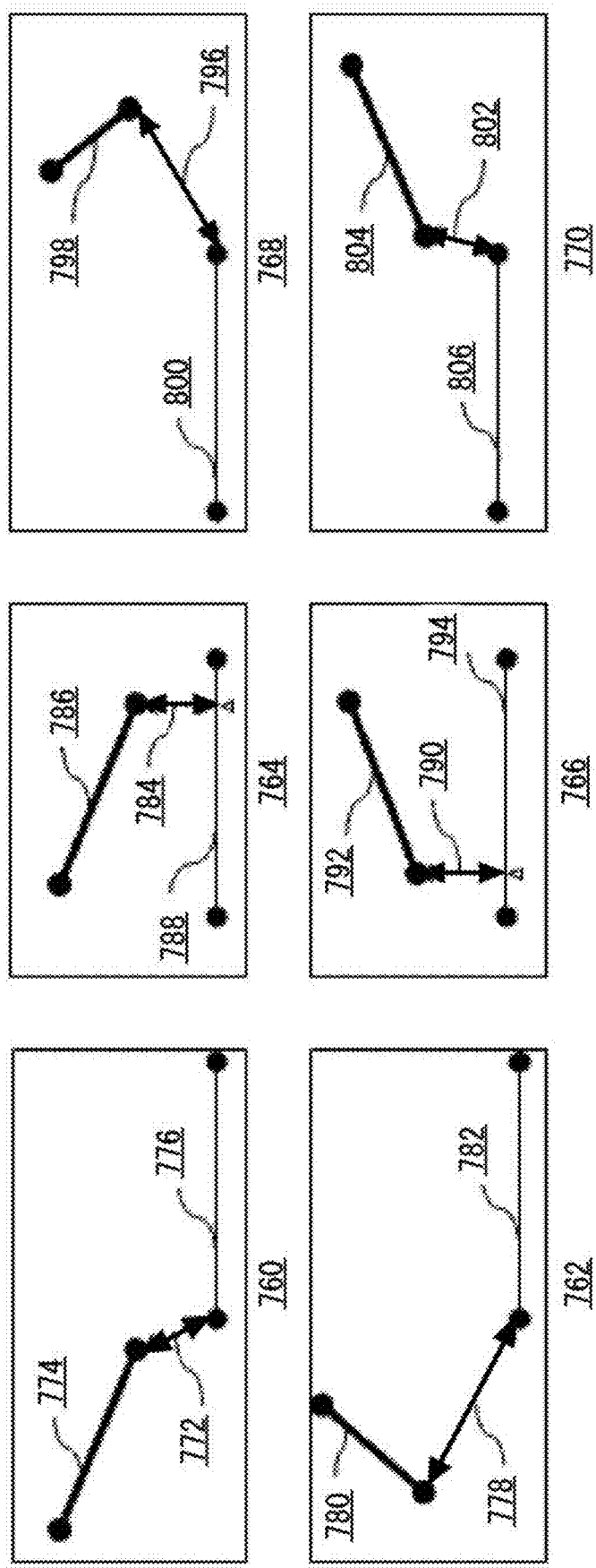
FIG. 7B illustrates example(s) of how to determine the shortest distance between 2 lines.

FIG. 7A and FIG. 7B each illustrates example(s) of how to determine the shortest distance between 2 lines. FIG. 7A illustrates the example of how to determine the shortest distance between 2 lines when they intersect. In 700, both lines 702 and 704 intersect and thus, the shortest distance between them is 0. FIG. 7B illustrates the various examples of how to determine the shortest distance between 2 lines when they do not intersect. 760 and 762 show that the shortest distance is formed when the bold lines 774 in 760 and 780 in 762 connect to the nearest point of the other line, which is the left point of the fine lines 776 in 760 and 782 in 762 respectively. In another example, 764 and 766 show that the shortest distance is formed when the bold lines 786 in 764 and 792 in 766 connect to the nearest point of the other line, which could be any point along the fine lines 788 in 764 and 794 in 766 respectively. In a last example, 768 and 770 show that the shortest distance is formed when the bold lines 798 in 768 and 804 in 770 connect to the nearest point of the other line, which is the right point of the fine lines 800 in 768 and 806 in 770 respectively.

Figure 8:
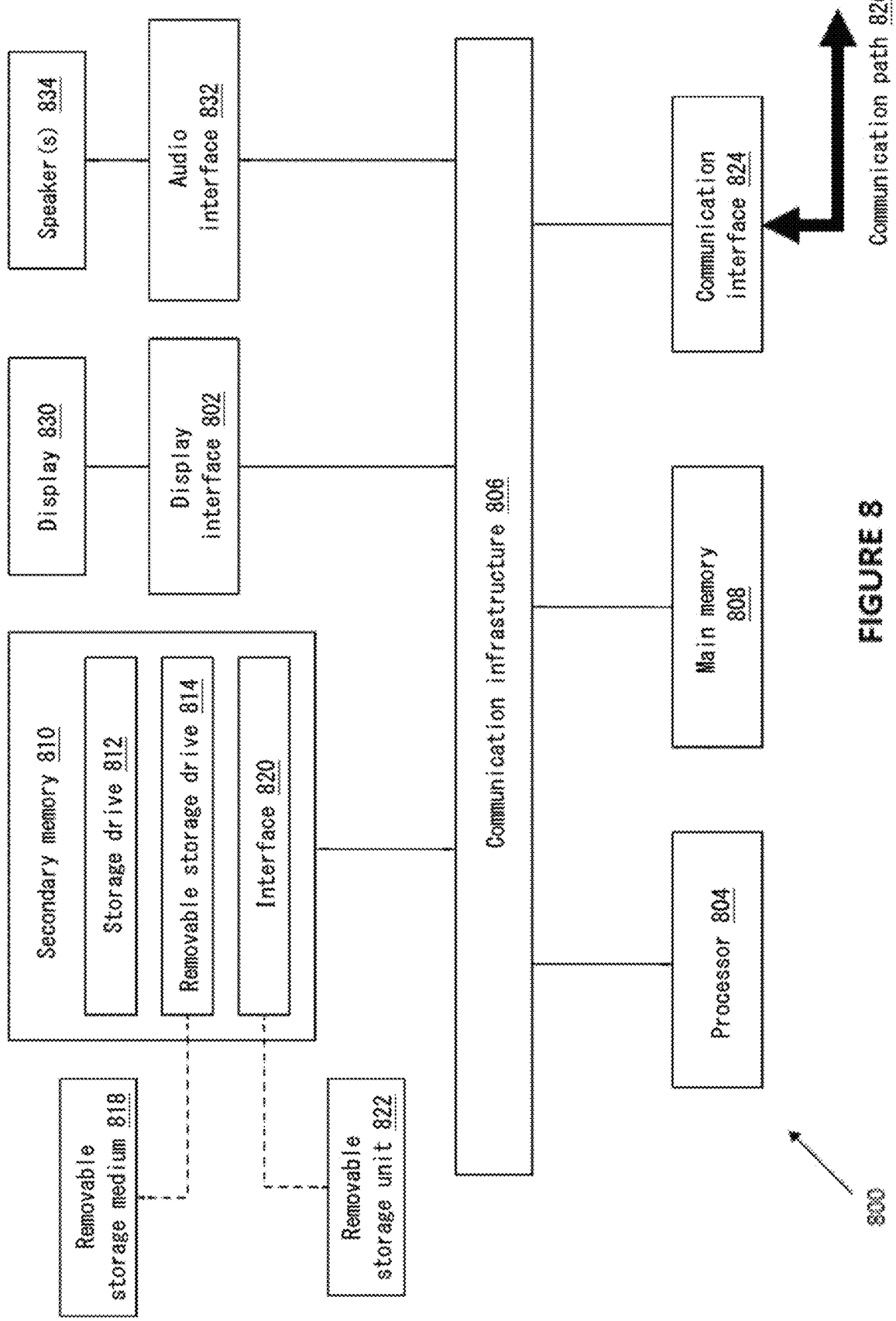
FIG. 8 shows a schematic diagram of a computer system 800 suitable for use to implement the apparatus 104 shown in FIG. 1.

FIG. 8 depicts an exemplary computer/computing device 800, hereinafter interchangeably referred to as a computer system 800, where one or more such computing devices 800 may be used to implement the apparatus 104 shown in FIG. 1. The following description of the computing device 800 is provided by way of example only and is not intended to be limiting.

As shown in FIG. 8, the example computing device 800 includes a processor 804 for executing software routines. Although a single processor is shown for the sake of clarity, the computing device 800 may also include a multi-processor system. The processor 804 is connected to a communication infrastructure 806 for communication with other components of the computing device 800. The communication infrastructure 806 may include, for example, a communications bus, cross-bar, or network.

The computing device 800 further includes a main memory 808, such as a random access memory (RAM), and a secondary memory 810. The secondary memory 810 may include, for example, a storage drive 812, which may be a hard disk drive, a solid state drive or a hybrid drive and/or a removable storage drive 814, which may include a magnetic tape drive, an optical disk drive, a solid state storage drive (such as a USB flash drive, a flash memory device, a solid state drive or a memory card), or the like. The removable storage drive 814 reads from and/or writes to a removable storage medium 844 in a well-known manner. The removable storage medium 844 may include magnetic tape, optical disk, non-volatile memory storage medium, or the like, which is read by and written to by removable storage drive 814. As will be appreciated by persons skilled in the relevant art(s), the removable storage medium 844 includes a computer readable storage medium having stored therein computer executable program code instructions and/or data.

In an alternative implementation, the secondary memory 810 may additionally or alternatively include other similar means for allowing computer programs or other instructions to be loaded into the computing device 800. Such means can include, for example, a removable storage unit 822 and an interface 840. Examples of a removable storage unit 822 and interface 840 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 822 and interfaces 840 which allow software and data to be transferred from the removable storage unit 822 to the computer system 800.

The computing device 800 also includes at least one communication interface 824. The communication interface 824 allows software and data to be transferred between computing device 800 and external devices via a communication path 826. In various embodiments of the inventions, the communication interface 824 permits data to be transferred between the computing device 800 and a data communication network, such as a public data or private data communication network. The communication interface 824 may be used to exchange data between different computing devices 800 which such computing devices 800 form part an interconnected computer network. Examples of a communication interface 824 can include a modem, a network interface (such as an Ethernet card), a communication port (such as a serial, parallel, printer, GPIB, IEEE 1394, RJ25, USB), an antenna with associated circuitry and the like. The communication interface 824 may be wired or may be wireless. Software and data transferred via the communication interface 824 are in the form of signals which can be electronic, electromagnetic, optical or other signals capable of being received by communication interface 824. These signals are provided to the communication interface via the communication path 826.

As shown in FIG. 8, the computing device 800 further includes a display interface 802 which performs operations for rendering images to an associated display 830 and an audio interface 832 for performing operations for playing audio content via associated speaker(s) 834.

As used herein, the term "computer program product" may refer, in part, to removable storage medium 844, removable storage unit 822, a hard disk installed in storage drive 812, or a carrier wave carrying software over communication path 826 (wireless link or cable) to communication interface 824. Computer readable storage media refers to any non-transitory, non-volatile tangible storage medium that provides recorded instructions and/or data to the computing device 800 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 800. Examples of transitory or non-tangible computer readable transmission media that may also participate in the provision of software, application programs, instructions and/or data to the computing device 800 include radio or infra-red transmission channels as well as a network connection to another computer or networked device, and the Internet or Intranets including e-mail transmissions and information recorded on Websites and the like.

The computer programs (also called computer program code) are stored in main memory 808 and/or secondary memory 810. Computer programs can also be received via the communication interface 824. Such computer programs, when executed, enable the computing device 800 to perform one or more features of embodiments discussed herein. In various embodiments, the computer programs, when executed, enable the processor 804 to perform features of the above-described embodiments. Accordingly, such computer programs represent controllers of the computer system 800.

Software may be stored in a computer program product and loaded into the computing device 800 using the removable storage drive 814, the storage drive 812, or the interface 840. Alternatively, the computer program product may be downloaded to the computer system 800 over the communications path 826. The software, when executed by the processor 804, causes the computing device 800 to perform functions of embodiments described herein.

It is to be understood that the embodiment of FIG. 8 is presented merely by way of example. Therefore, in some embodiments one or more features of the computing device 800 may be omitted. Also, in some embodiments, one or more features of the computing device 800 may be combined together. Additionally, in some embodiments, one or more features of the computing device 800 may be split into one or more component parts.

For example, the method of FIG. 2A and FIG. 2B may be implemented as software and stored in a non-transitory fashion in the secondary memory 810 or the removable storage units 818, 822 of the computer device 800.

It will be appreciated by a person skilled in the art that numerous variations and/or modifications may be made to the present invention as shown in the specific embodiments without departing from the spirit or scope of the invention as broadly described. For example, the above description mainly presenting alerts on a visual interface, but it will be appreciated that another type of alert presentation, such as sound alert, can be used in alternate embodiments to implement the method. Some modifications, e.g. adding an access point, changing the log-in routine, etc. may be considered and incorporated. The present embodiments are, therefore, to be considered in all respects to be illustrative and not restrictive.

Supplementary Note 1

A method for determining a duration and at least a region of interest for managing an event, the method comprising:
    determining a set of coordinates each for two or more appearances of a target subject within a sequence of images, the set of coordinates of the two or more appearances of the target subject defining a first path;
    determining a set of coordinates each for two or more appearances of a related subject within a sequence of images, the related subject relating to the target subject, the set of coordinates of the two or more appearances of the related subject defining a second path;
    determining one or more minimum distances between the first path and the second path so as to determine at least a region of interest;
    determining a timestamp of a first appearance and a timestamp of a last appearance of the target subject; and
    determining a timestamp of a first appearance and a timestamp of a last appearance of the related subject when it is determined that at least one of the one or more minimum distances between the first path and the second.

Supplementary Note 2

The method of note 1, wherein the step of determining a set of coordinates each for two or more appearances of the target subject within the sequence of images comprises:
    receiving, from an image capturing device, a plurality of image inputs relating to the event;
    identifying one or more of a characteristic information from each of the plurality of image inputs relating to the event; and
    determining if each of the one or more identified characteristic information is likely to correspond to a target subject characteristic information, the characteristic information comprising facial information and body movement information.

Supplementary Note 3

The method of note 2, further comprising:
    retrieving at least one of the received image inputs in response to determining when one of the one or more identified characteristic information is likely to correspond to the target subject characteristic information, the retrieved at least one of the received image inputs relating to the characteristic information that is likely to correspond to the target subject characteristic information.

Supplementary Note 4

The method of note 3, wherein the step of retrieving the at least one of the received image inputs further comprises:

retrieving one or more further image inputs in response to determining when one of the one or more identified characteristic information is likely to correspond to the target subject characteristic information, the retrieved one or more further image inputs relating to the characteristic information that is likely to correspond to the target subject characteristic information; and retrieving a plurality of sets of coordinates and a plurality of timestamps, each relating to an appearance of the target subject within each of the retrieved one or more further image inputs, the plurality of sets of coordinates and the plurality of timestamps including the sets of coordinates and the timestamps of the first appearance and the last appearance of the target subject.

Supplementary Note 5

The method of note 4, wherein the step of determining the set of coordinates of the first appearance and the set of coordinates of the last appearance of the related subject within the image input comprises:
retrieving, within a search period, at least one of the received image inputs in response to determining when one of the one or more identified characteristic information is likely to correspond to a target subject characteristic information, the retrieved at least one of the received image inputs relating to a characteristic information that is likely to not correspond to the target subject characteristic information, wherein the search period is one which starts at a pre-determined period before the first appearance of the target subject and ends at a pre-determined period after the last appearance.

Supplementary Note 6

The method of note 5, wherein the step of retrieving the at least one of the received image inputs further comprises:
retrieving one or more further image inputs in response to determining when one of the one or more identified characteristic information is likely to correspond to the target subject characteristic information, the retrieved one or more further image inputs relating to the characteristic information that is likely to not correspond to the target subject characteristic information; and
retrieving a plurality of sets of coordinates and a plurality of timestamps, each relating to an appearance of the related subject within each of the retrieved one or more further image inputs, the plurality of sets of coordinates and the plurality of timestamps including the sets of coordinates and the timestamps of the first appearance and the last appearance of the related subject.

Supplementary Note 7

The method of note 6, wherein the step of determining one or more minimum distances between the first path and the second path comprises:
determining another set of coordinates corresponding to another appearance of the target subject on the first path or related subject on the second path; and determining one or more set of coordinates on either one of the first path or the second path to a position on the other path so as to determine the one or more minimum distances.

Supplementary Note 8

The method of note 7, wherein the step of determining one or more minimum distances between the first path and the second path further comprises: determining if the determined one or more minimum distances between the first path and the second path is within a pre-determined distance so as to determine one or more minimum points.

Supplementary Note 9

The method of note 8, wherein the step of determining the region of interest comprises:
connecting the one or more minimum points so as to determine the region of interest.

Supplementary Note 10

The method of note 8, wherein the step of determining the duration of interest comprises:
determining if at least one of the determined one or more minimum distances between the first path and the second path is within the pre-determined distance; and
determining an earliest timestamp and a last timestamp from the determined timestamp of the first appearance of the target subject, the determined timestamp of the last appearance of the target subject, the determined timestamp of the first appearance of the related subject and the determined timestamp of the last appearance of the related subject, wherein the duration from the earliest timestamp to the last timestamp corresponds to the duration of interest, in response to determining that at least one of the determined one or more minimum distances between the first path and the second path is within the pre-determined distance.

Supplementary Note 11

An apparatus for determining a duration and at least a region of interest for managing an event, the apparatus comprising:
a memory in communication with a processor, the memory storing a computer program recorded therein, the computer program being executable by the processor to cause the apparatus at least to:
determine a set of coordinates each for two or more appearances of a target subject within a sequence of images, the set of coordinates of the two or more appearances of the target subject defining a first path;
determine a set of coordinates each for two or more appearances of a related subject within a sequence of images, the related subject relating to the target subject, the set of coordinates of the two or more appearances of the related subject defining a second path;
determine one or more minimum distances between the first path and the second path so as to determine at least a region of interest;
determine a timestamp of a first appearance and a timestamp of a last appearance of the target subject; and
determine a timestamp of a first appearance and a timestamp of a last appearance of the related subject when it is determined that at least one of the one or more minimum distances between the first path and the second path is within a predetermined distance so as to determine a duration of interest.

Supplementary Note 12

The apparatus of note 11, wherein the memory and the computer program is executed by the processor to cause the apparatus further to:

receive, from an image capturing device, a plurality of image inputs relating to the event;
identify one or more of a characteristic information from each of the plurality of image inputs relating to the event; and
determine if each of the one or more identified characteristic information is likely to correspond to a target subject characteristic information, the characteristic information comprising facial information and body movement information.

Supplementary Note 13

The apparatus of note 12, wherein the memory and the computer program is executed by the processor to cause the apparatus further to:
retrieve at least one of the received image inputs in response to determining when one of the one or more identified characteristic information is likely to correspond to the target subject characteristic information, the retrieved at least one of the received image inputs relating to the characteristic information that is likely to correspond to the target subject characteristic information.

Supplementary Note 14

The apparatus of note 13, wherein the memory and the computer program is executed by the processor to cause the apparatus further to:
retrieve one or more further image inputs in response to determining when one of the one or more identified characteristic information is likely to correspond to the target subject characteristic information, the retrieved one or more further image inputs relating to the characteristic information that is likely to correspond to the target subject characteristic information; and
retrieve a plurality of sets of coordinates and a plurality of timestamps, each relating to an appearance of the target subject within each of the retrieved one or more further image inputs, the plurality of sets of coordinates and the plurality of timestamps including the sets of coordinates and the timestamps of the first appearance and the last appearance of the target subject.

Supplementary Note 15

The apparatus of note 14, wherein the memory and the computer program is executed by the processor to cause the apparatus further to:
retrieve, within a search period, at least one of the received image inputs in response to determining when one of the one or more identified characteristic information is likely to correspond to a target subject characteristic information, the retrieved at least one of the received image inputs relating to a characteristic information that is likely to not correspond to the target subject characteristic information, wherein the search period is one which starts at a pre-determined period before the first appearance of the target subject and ends at a pre-determined period after the last appearance.

Supplementary Note 16

The apparatus of note 15, wherein the memory and the computer program is executed by the processor to cause the apparatus further to:
retrieve one or more further image inputs in response to determining when one of the one or more identified characteristic information is likely to correspond to the target subject characteristic information, the retrieved one or more further image inputs relating to the characteristic information that is likely to not correspond to the target subject characteristic information; and
retrieve a plurality of sets of coordinates and a plurality of timestamps, each relating to an appearance of the related subject within each of the retrieved one or more further image inputs, the plurality of sets of coordinates and the plurality of timestamps including the sets of coordinates and the timestamps of the first appearance and the last appearance of the related subject.

Supplementary Note 17

The apparatus of note 16, wherein the memory and the computer program is executed by the processor to cause the apparatus further to:
determine another set of coordinates corresponding to another appearance of the target subject on the first path or related subject on the second path; and
determine one or more set of coordinates on either one of the first path or the second path to a position on the other path so as to determine the one or more minimum distances.

Supplementary Note 18

The apparatus of note 17, wherein the memory and the computer program is executed by the processor to cause the apparatus further to:
determine if the determined one or more minimum distances between the first path and the second path is within a pre-determined distance so as to determine one or more minimum points.

Supplementary Note 19

The apparatus of note 18, wherein the memory and the computer program is executed by the processor to cause the apparatus further to:
connect the one or more minimum points so as to determine the region of interest.

Supplementary Note 20

The apparatus of note 18, wherein the memory and the computer program is executed by the processor to cause the apparatus to:
determine if at least one of the determined one or more minimum distances between the first path and the second path is within the pre-determined distance; and
determine an earliest timestamp and a last timestamp from the determined timestamp of the first appearance of the target subject, the determined timestamp of the last appearance of the target subject, the determined timestamp of the first appearance of the related subject and the determined timestamp of the last appearance of the related subject, wherein the duration from the earliest timestamp to the last timestamp corresponds to the duration of interest, in response to determining that at least one of the determined one or more minimum distances between the first path and the second path is within the pre-determined distance.

Supplementary Note 21

A system for determining a duration and at least a region of interest for managing an event, the system comprising:
the apparatus as noted in any one of notes 11-20 and at least one of an image capturing device.

This application is based upon and claims the benefit of priority from Singapore Patent Application No. 10201807675T, filed on Sep. 6, 2018, the disclosure of which is incorporated herein in its entirety by reference.

REFERENCE SIGNS LIST

102 Image Capturing Device
104 Apparatus
106 Memory
108 Processor
110 Database
820 Display interface
804 Processor
806 Communication infrastructure
808 Main memory
810 Secondary memory
812 Storage drive
814 Removable storage drive
818 Removable Storage medium
820 Interface
822 Removable storage unit
824 Communication interface
830 Display
832 Audio interface
834 Speaker

The invention claimed is:

1. An apparatus comprising:
a memory storing instructions; and
a processor connected to the memory and configured to execute the instructions to:
detect a target subject and a related subject from a plurality of images;
define a first path indicating a path of the target subject and a second path indicating a path of the related subject;
determine a region of interest with the largest possible region of interest of co-appearances of the target subject and the related subject according to a positional relationship between the first path and the second path;
receive, from an image capturing device, a plurality of image inputs relating to the event;
identify one or more of a characteristic information from each of the plurality of image inputs relating to the event; and
determine if each of the one or more identified characteristic information is likely to correspond to a target subject characteristic information, the characteristic information comprising facial information and body movement information.

2. The apparatus according to claim 1, wherein the processor is configured to execute the instructions to retrieve at least one of the received image inputs in response to determining when one of the one or more identified characteristic information is likely to correspond to the target subject characteristic information, the retrieved at least one of the received image inputs relating to the characteristic information that is likely to correspond to the target subject characteristic information.

3. The apparatus according to claim 2, wherein the processor is configured to execute the instructions to:
retrieve one or more further image inputs in response to determining when one of the one or more identified characteristic information is likely to correspond to the target subject characteristic information, the retrieved one or more further image inputs relating to the characteristic information that is likely to correspond to the target subject characteristic information; and
retrieve a plurality of sets of coordinates and a plurality of timestamps, each relating to an appearance of the target subject within each of the retrieved one or more further image inputs, the plurality of sets of coordinates and the plurality of timestamps including the sets of coordinates and the timestamps of the first appearance and the last appearance of the target subject.

4. The apparatus according to claim 3, wherein the processor is configured to execute the instructions to retrieve, within a search period, at least one of the received image inputs in response to determining when one of the one or more identified characteristic information is likely to correspond to a target subject characteristic information, the retrieved at least one of the received image inputs relating to a characteristic information that is likely to not correspond to the target subject characteristic information, wherein the search period is one which starts at a pre-determined period before the first appearance of the target subject and ends at a pre-determined period after the last appearance.

5. The apparatus according to claim 4, wherein the processor is configured to execute the instructions to:
retrieve one or more further image inputs in response to determining when one of the one or more identified characteristic information is likely to correspond to the target subject characteristic information, the retrieved one or more further image inputs relating to the characteristic information that is likely to not correspond to the target subject characteristic information; and
retrieve a plurality of sets of coordinates and a plurality of timestamps, each relating to an appearance of the related subject within each of the retrieved one or more further image inputs, the plurality of sets of coordinates and the plurality of timestamps including the sets of coordinates and the timestamps of the first appearance and the last appearance of the related subject.

6. The apparatus according to claim 5, wherein the processor is configured to execute the instructions to:
determine another set of coordinates corresponding to another appearance of the target subject on the first path or related subject on the second path, path; and
determine one or more set of coordinates on either one of the first path or the second path to a position on the other path so as to determine the one or more minimum distances.

7. The apparatus according to claim 6, wherein the processor is configured to execute the instructions to determine if the determined one or more minimum distances between the first path and the second path is within a pre-determined distance so as to determine one or more minimum points.

8. The apparatus according to claim 7, wherein the processor is configured to execute the instructions to connect the one or more minimum points so as to determine the region of interest.

9. The apparatus according to claim 8, wherein the processor is configured to execute the instructions to:

determine if at least one of the determined one or more minimum distances between the first path and the second path is within the pre-determined distance; and determine an earliest timestamp and a last timestamp from the determined timestamp of the first appearance of the target subject, the determined timestamp of the last appearance of the target subject, the determined timestamp of the first appearance of the related subject and the determined timestamp of the last appearance of the related subject, wherein the duration from the earliest timestamp to the last timestamp corresponds to the duration of interest, in response to determining that at least one of the determined one or more minimum distances between the first path and the second path is within the pre-determined distance.

10. A method performed by at least a processor, wherein the method comprises:

detecting a target subject and a related subject from a plurality of images;

defining a first path indicating a path of the target subject and a second path indicating a path of the related subject;

determining a region of interest with the largest possible region of interest of co-appearances of the target subject and the related subject according to a positional relationship between the first path and the second path;

receiving, from an image capturing device, a plurality of image inputs relating to the event;

identifying one or more of a characteristic information from each of the plurality of image inputs relating to the event; and determining if each of the one or more identified characteristic information is likely to correspond to a target subject characteristic information, the characteristic information comprising facial information and body movement information.

11. A non-transitory computer-readable medium storing a program that, if executed, causes a processor to:

detect a target subject and a related subject from a plurality of images;

define a first path indicating a path of the target subject and a second path indicating a path of the related subject;

determine a region of interest with the largest possible region of interest of co-appearances of the target subject and the related subject according to a positional relationship between the first path and the second path;

receive, from an image capturing device, a plurality of image inputs relating to the event;

identify one or more of a characteristic information from each of the plurality of image inputs relating to the event; and determine if each of the one or more identified characteristic information is likely to correspond to a target subject characteristic information, the characteristic information comprising facial information and body movement information.

* * * * *